United States Patent Office

3,347,943
Patented Oct. 17, 1967

3,347,943
NOVEL PROCESS FOR THE PREPARATION OF OLEFINIC COMPOUNDS AND DERIVATIVES THEREOF
André Jule Hubert, Brussels, Belgium, assignor to Union Carbide Corporation, a corporation of New York
No Drawing. Filed Sept. 15, 1964, Ser. No. 396,738
5 Claims. (Cl. 260—666)

This invention relates to a novel process for the preparation of olefinic compounds and derivatives thereof. In one aspect, this invention relates to a novel process for the preparation of olefinically unsaturated compounds having a double bond in the terminal position. In another aspect, this invention relates to a novel process for the exclusive preparation of the cis-geometric isomers of olefinically unsaturated compounds. In a further aspect, this invention relates to a novel process for the preparation of certain derivatives obtained from olefinically unsaturated compounds.

Numerous methods have been reported in the literature for the preparation of olefinically unsaturated compounds. For instance, it is well known that olefins can be prepared by the dehydrohalogenation of halohydrocarbons or the dehydration of alcohols. Moreover, it is also well known that olefinically unsaturated compounds can be prepared by the partial reduction of acetylenic bonds. Each of the aforesaid methods has widespread application in the industrial preparation of olefins and accounts for a sizeable portion of unsaturated compounds currently being produced.

In many instances, however, a particular olefinically unsaturated compound is desired which can not be prepared conveniently by the aforementioned techniques, or which is obtained in admixture with other isomers and hence, difficult to separate. In such cases, other synthetic routes have been devised. Among the many methods used in the preparation of specific olefins are those involving the rearrangement or reaction of other unsaturated compounds. For example, olefinically unsaturated compounds having the double bond in a desired position can be prepared by the rearrangement or isomerization of other less desirable olefins by the use of certain catalysts. For instance it is known that olefins undergo an exchange or displacement reaction with trialkylboranes wherein the alkyl groups have more than one carbon atom and carry at least one beta-hydrogen atom. For example, this reaction can be illustrated by the following equation:

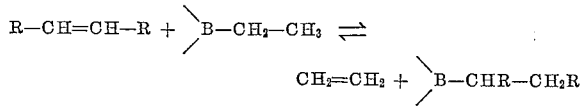

This reaction is quite slow and reversible and is the basis for the use of the trialkylboranes as isomerization catalysts.

More recently this reaction has been employed in the preparation of olefins from the alkyl substituents of the trialkylborane. However, since the reaction is slow and reversible it is not possible to obtain good yields unless the olefin is removed, for example, by distillation. If the olefin is not readily removed from the reactants, the problem of separation is greatly increased.

It is therefore an object of this invention to provide a novel process for the preparation of olefinic compounds. Another object of this invention is to provide a novel process for the preparation of olefins by the reaction of acetylenic compounds with tri-substituted boranes. A further object is to provide a novel process for the preparation of olefinically unsaturated compounds having the double bond exclusively in the terminal position. Another object of this invention is to provide a novel process for the preparation of cis-geometric isomers of olefinically unsaturated compounds. A still further object of this invention is to provide a novel process for the preparation of unsaturated ketones. These and other objects will readily become apparent to those skilled in the art in the light of the teachings herein set forth.

In its broad aspect, the present invention relates to a novel process for the preparation of olefinic compounds and certain derivatives thereof. The process comprises the reaction of an acetylenic compound with a tri-substituted borane in accordance with the equation:

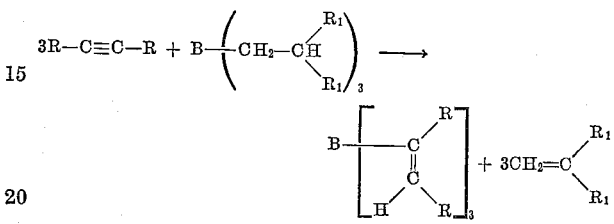

wherein R represents a monovalent aliphatic, alicyclic or heterocyclic organic group attached to the acetylenic carbon atoms through a carbon to carbon bond and $R_1$ represents hydrogen or a monovalent aliphatic, alicyclic or heterocyclic organic group. Additionally, both R's when taken together can form a cycloaliphatic ring with the acetylenic carbon atoms to which they are attached. Preferred compositions which can be employed in the process of the instant invention include those wherein R and $R_1$ represent aliphatic, cycloaliphatic or aromatic groups of up to 18 carbon atoms. Also preferred are those compositions of the aforementioned formulae where R and $R_1$ represent hydrocarbon groups of from 1 to 12 carbon atoms. Particularly preferred compositions which can be used in the instant process are those wherein R and $R_1$ represent alkyl, alkenyl, alkynyl, cycloalkyl, cycloalkenyl, cycloalkylalkyl, cycloalkenylalkyl, aryl, aralkyl, haloalkyl, alkyloxyalkyl, and the like, with the proviso that any unsaturation in said R or $R_1$ groups be at least one carbon atom received from the carbon atom to which they are attached.

It was unexpected and surprising to find that the acetylenic compound underwent transformation to the trialkenylborane rather than isomerization into the expected conjugated diolefin. Moreover, in contrast to previous methods wherein tri-substituted boranes were employed, the aforesaid reaction involved an irreversible transfer of boron to the acetylenic bond with liberation of the olefin.

As hereinbefore indicated the reaction of the acetylenic compound and the tri-substituted boranes is effected by heating an admixture thereof preferably in an inert solvent. Although the temperature employed will largely be dependent upon the particular reactants, in general, a temperature range of from 125° C. to about 250° C., and more preferably from about 160° C. to about 200° C. has been found to be satisfactory. Temperatures above and below the aforesaid ranges can also be employed but are less preferred. In practice, the temperature employed need only be sufficient to cause disassociation of the borane compound.

Separation of the olefinically unsaturated hydrocarbon from the trialkenylborane can be effected by a variety of conventional techniques. For example, when triisobutylborane is employed the resulting isobutane distills off from the reaction mixture and can be recovered by condensation.

The contact time necessary to effect the novel process of the invention need only be of such duration as to insure optimum conversion of the acetylenic compound to the trialkenylborane. Reaction times of from a few seconds to several minutes are thoroughly practical. Shorter or longer periods can also be employed depending upon the temperature and the manner in which the process is conducted. However, the reaction with an acetylene compound is particularly rapid and the desired reaction products are obtained in a relatively short period.

The use of an inert solvent as the reaction medium is not absolutely necessary. In most instances the tri-substituted borane compound can itself serve as the reaction medium and hence, a separate solvent is not necessary. However, if desired, the reaction of the acetylenic compound with the tri-substituted borane can be conducted in an inert, anhydrous, normally liquid organic solvent. In general, the choice of solvent will largely be dependent upon its boiling point, its inability to undergo reactions with either the starting material or reaction products; its ease of separation from the reaction products, as well as economic considerations. Due to the fact that water interferes with the reaction, the solvents which are employed are preferably inert, anhydrous organic solvents.

A variety of inert, anhydrous, organic solvents can optionally be employed in the practice of the instant process. For example, saturated aliphatic hydrocarbons, aromatic hydrocarbons, saturated aliphatic ethers, saturated cycloaliphatic ethers, and the like, can be employed. Typical solvents which can be used include toluene, xylene, dioxane, dibutyl ether, and the like. The amount of solvent present can vary within wide limits and will vary with the particular reactants used and the manner in which the process is conducted. Preferred solvents are those completely miscible with the reactants and which can be readily separated from the reaction products.

Pressure is not necessarily critical and the process can be conducted at atmospheric, subatmospheric or superatmospheric pressures. Additionally, if desired, the process can be conducted in an inert atmosphere, such as nitrogen, argon, and the like.

In practice it has been observed that there are two features which are critical to the successful practice of the instant invention. First, it is necessary that only disubstituted acetylenic compounds be employed and secondly, that compounds having three or more conjugated triple bonds be avoided. Monosubstituted acetylenes give, after hydrolysis of the trialkenylborane, only small quantities of vinyl compounds in addition to polymeric substances. Compounds having three or more conjugated triple bonds give only polymerization products.

The starting materials of the present invention, as hereinbefore indicated, are the disubstituted acetylene compounds and trisubstituted boranes. Illustrative acetylenic compounds which can be employed in the process of the invention include, among others, such compounds as the alkynes, e.g., 2-butyne, 2-pentyne, 2-hexyne, 3-heptyne, 3-nonyne, 6-dodecyne, 5-tetradecyne, 2-tetracosyne and the like. The alkadiynes, e.g., 2,4-hexadiyne, 2,4-heptadiyne, 3,6-octadiyne, 2,6-nonadiyne, and the like; the non-conjugated alkatriynes, e.g., 2,4,7-nonatriyne, 2,4,9-hendecatriyne, and the like; the cycloalkynes, e.g., cyclohexyne, cycloheptyne, cyclononyne, cyclotetradecyne, cyclooctadecyne, and the like; the cycloalkadiynes, e.g., 1,7-cyclotetradecadiyne, 1,8-cyclohexadecadiyne, 1,9 - cyclooctadecadiyne and the like; the aryl substituted alkynes, e.g., diphenylacetylene, dinaphthyl acetylene, and the like; the heterocyclic substituted alkynes, e.g., difurylacetylene, and the like. Additionally, acetylenic compounds having ether groups, i.e., alkoxy, cycloalkoxy, aryloxy, or halogen group, i.e., fluorine or chlorine, can also be employed.

The borane compounds which have been found suitable for use in the process of the present invention are the trihydrocarbylborane having at least one, and preferably three beta-hydrogen atoms. Typical compounds include the trialkylboranes, e.g., triethylborane, tripropylborane, tributylborane, triisobutylborane, tripentylborane, trihexylborane, trioctylborane, tridodecylborane, propyldibutyborane, and the like; the cycloalkyl-substituted boranes, e.g., tricyclohexylborane, cyclohexyldiethylborane, cyclohexyldibutylborane, ethyldicyclohexylborane, and the like; the aryl-substituted boranes, e.g., phenyldiethylborane, phenyldibutylborane, dipropylphenylborane and the like.

In one embodiment, the process of the present invention is particularly useful for the preparation of olefins having the double bond exclusively in the terminal position. These compounds are conveniently represented by the formula:

wherein $R_1$ has the same value as previously indicated. In contrast, the known methods for preparing terminally unsaturated compounds result largely in a mixture of olefins, i.e., those having terminal and internal unsaturation. The method of this embodiment of the invention is a particularly attractive and advantageous route to terminally unsaturated compounds. For example, mixtures of isomeric olefins obtained by dehydration of an alcohol, give after treatment with trialkylborane under isomerizing conditions, only the most stable primary boranes. Thus, upon treatment with a higher boiling acetylenic compound, the liberated olefin will have exclusively a terminal double bond. The method is also particularly attractive, since two desired products can be prepared in the same reaction. For example, the acetylene compound can be chosen which will give a desired olefin or acetone in addition to the terminally unsaturated compound.

In a further embodiment, the invention is directed to a novel process for the stereospecific partial reduction of acetylenic compounds. Acid hydrolysis of the aforementioned trialkenylboranes, for example with acetic acid, provides solely the cis-isomer in a high degree of purity and in yields of up to 90 percent, and higher. Moreover, the reaction is easy to control, no over-reduction takes place and no other geometric isomers are formed. Any loss is due solely to polymerization. Hence, this method offers many advantages over the presently known methods, particularly for the conjugated diacetylenes.

In another embodiment, the process of the present invention is particularly useful in the preparation of unsaturated ketones from compounds containing more than one triple bond. The trialkenylborane compound formed by the reaction of the acetylenic compound and the trialkylborane, can be conveniently oxidized to a ketone with alkaline hydrogen peroxide. A particularly interesting application of this process is the transformation of one triple bond in cyclic diynes to a keto group to provide a simple synthesis of unsaturated ketones. For instance, cis-cycloheptadec-9-en-1-one, a homolog of the valuable perfume civetone, can readily be prepared from available starting materials in accordance with the following equation:

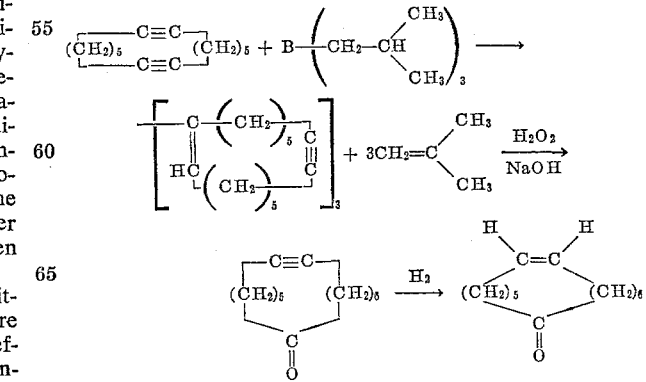

The starting diyne is employed in a large excess and can easily be recovered by distillation. Other unsaturated ketones can also be prepared by the aforesaid process, for example, cis-cyclotetradec-7-en-1-one, cis - cyclohexadeca-8-en-1-one, and cis-cyclooctadeca-9-ene-1-one have been prepared from 1,7-cyclotetradecadiyne, 1,8-cyclohexadecadiyne, and 1,9-cyclooctadecadiyne.

The following examples are illustrative:

*Example 1.—Preparation of cis-dec-5-ene*

Dec-5-yne (10 grams, 0.068 mole) was dissolved in triisobutylborane (12 grams, 0.66 mole) and heated to 170° C. in an oil bath under a nitrogen atmosphere. Approximately 91 percent of the expected isobutene was evolved. Thereafter, the mixture was hydrolyzed with acetic acid, the hydrocarbon extracted, and the last traces of boranes destroyed with alkaline hydrogen peroxide. Extractions with hexane and distillation gave 8.8 grams of cis-dec-5-ene having a boiling point of 50–60° C. at a pressure of 20 millimiters of mercury. Infrared analysis showed bands for a cis-double bond at 3.34, 6.04 and 1.4μ.

*Example 2.—Preparation of cis,cis-dodeca-5,7-diene*

Dodeca-5,7-diyne (5.2 grams, 0.032 mole) was heated at 170° C. with triisobutylborane (10.9 grams, 0.65 mole). By weighing before and after the reaction it was determined that approximately 99 percent of isobutene was evolved. After recovery of the excess borane by distillation and hydrolysis with acetic acid, cis,cis-dodeca-5,7-diene was isolated by distillation. The product had a boiling point of 120° C. at a pressure of 3 millimeters of mercury and represented 42 percent of the theoretical yield. Upon analysis the product was found to have the following composition: Calculated for $C_{12}H_{22}$: C, 86.7; H, 13.3. Found: C, 86.2; H, 13.4. The infrared spectrum showed bands for conjugated cis-double bond at 3.32, 6.20, and 14.0μ. The ultraviolet spectrum showed a structureless band at 236 mμ (ε 24,000).

*Example 3.—Preparation of cis,cis-hexadeca-7,9-diene*

Hexadeca-7,9-diyne (10 grams, 0.046 mole) and triisobutylborane (16.7 grams, 0.092 mole) were heated at 170° C. Approximately 91 percent of isobutene was evolved. Cis,cis-hexadeca-7,9-diene having a boiling point of 120° C. at 0.01 millimeter of pressure was isolated by distillation. The infrared spectrum showed bands at 3.30, 6.22, and 14.0μ.

*Example 4.—Preparation of cis-stilbene*

Diphenylacetylene (2 grams, 0.011 mole) was dissolved in triisobutylborane (2 grams, 0.011 mole) and heated in 170° C. After the evolution of isobutene had ceased, the excess triisobutylborane was distilled off and the product hydrolyzed as in the previous examples. Cis-stilbene. 1.6 grams, was isolated by distillation and found to have a boiling point of 120° C. at 1 millimeter of mercury pressure. The infrared spectrum showed bands for the cis-double bond at 3.27, 6.24, and 14.4μ. The ultraviolet spectrum had structureless bands at 207, 225, and 278 mμ (ε 22,000, 19,700, 10,600).

*Example 5.—Preparation of cis,cis-1,4-diphenylbuta-1,3-diene*

Diphenylbuta-1,3-diyne (0.25 mole) was reacted with triisobutylborane (0.50 mole) at 170° C. and 75 percent of the expected quantity of isobutene evolved. Thereafter, the cis,cis-1,4-diphenylbuta-1,3-diene was isolated in a 36 percent yield. The product had a melting point of 63° C. The ultraviolet spectrum showed a maximum at 300 mμ (ε 29,800).

*Example 6.—Preparation of cis,cis-1,14-diphenyltetradeca-6,8-diene*

In a manner similar to that employed in the previous examples, cis,cis-1,14-diphenyltetradeca-6,8 - diene was prepared from 1,14-diphenyltetradeca-6,8-diyne and diisobutylborane. A yield of 13 percent was obtained. Upon analysis the product was found to have the following composition: Calculated for $C_{26}H_{34}$: C, 90.1; H, 9.9. Found: C, 90.3, H, 9.8. Infrared bands for cis-double bonds were at 3.30, 3.34, 6.22 and 14.4μ. The ultraviolet maximum was at 236 mμ (ε 25,300).

*Example 7.—Preparation of cis,cis-dicyclohexylbuta-1,3-diene*

In a manner similar to that employed in the previous examples cis,ci-dicyclohexylbuta-1,3-diene was obtained in a 50 percent yield from the reaction of dicyclohexylbuta-1,3-diyne and triisobutylborane. Upon analysis, the product was found to have the following composition: Calculated for $C_{16}H_{26}$: C, 88.0; H, 12.0. Found: C, 86.85; H, 11.8. Infrared bands for cis-double bonds were at 3.30, 3.34, 6.25 and 13.8μ. Ultraviolet absorption maximum was at 238 mμ (ε 24,900).

*Example 8.—Preparation of cis,cis-cyclotetradeca-1,8-diene*

Cyclotetradeca-1,8-diyne (15 grams, 0.08 mole) was dissolved in triisobutylborane (20 grams, 0.11 mole) and heated in an oil bath under a nitrogen atmosphere. Evolution of isobutene started slowly at 150° C., became vigorous at 170° C., then stopped sharply after 5 minutes. By weighing the reaction mixture before and after the reactions, it was determined that one mole of isobutene had been evolved. The excess of triisobutylborane was recovered by distillation at a pressure of 0.01 millimeter of mercury. Thereafter, acetic acid (20 milliliters) was added to the residue, and the mixture heated on a water bath for 5 minutes. After addition of water, cis,cis-cyclotetradeca-1,8-diene was extracted with hexane. Recrystallization gave 10 grams of product having a melting point of 43–45° C.

*Example 9.—Preparation of cis-cyclooctadeca-1,3,10,12-tetraene*

In a manner similar to that employed in the previous examples the all cis-cyclooctadeca-1,3,10,12-tetraene was prepared from cyclooctadeca-1,3,10,12-tetrayne and triisobutylborane. A yield of 33 percent was obtained. Upon analysis the product was found to have the following composition: Calculated for $C_{18}H_{28}$: C, 88.45; H, 11.55. Found: C, 88.4; H, 11.6. Infrared bands were found at 3.33, 6.25 and 14.0μ. The ultraviolet maximum was at 229 mμ (ε 55,000).

*Example 10.—Preparation of cis-cycloeicosa-1,3,11,13-tetraene*

In a manner similar to that employed in the previous examples, the all cis-cycloeicosa-1,3,11,13-tetraene was prepared from cycloeicosa-1,3,11,13-tetrayne and triisobutylborane. A yield of 15 percent was obtained. Upon analysis the product was found to have the following composition: Calculated for $C_{20}H_{32}$: C, 88.2; H, 11.8. Found: C, 87.0; H, 11.4. Infrared bands were found at 3.33, 6.25 and 14.0μ. The ultraviolet maximum was at 229 mμ (ε 44,700).

*Example 11.—Preparation of cis-cyclodocosa-1,3,12,14-tetraene*

In a manner similar to that employed in the previous examples, the all cis-cyclodocosa-1,3,12,14-tetraene was prepared from cyclodocosa-1,3,12,14-tetrayne. A yield of 23 percent was obtained. Upon analysis the product was found to have the following composition: Calculated for $C_{22}H_{36}$: C, 87.9; H, 12.1. Found: C, 88.2; H, 12.2. Infrared bands were found at 3.33, 6.25 and 14.0μ. The ultraviolet maximum was at 229 mμ (ε 50,000).

*Example 12.—Preparation of cis-cyclotetracosa-1,3,13,15-tetraene*

In a manner similar to that employed in the previous examples the all cis-cyclotetracosa-1,3,13,15-tetraene was prepared from cyclotetracosa-1,3,13,15-tetrayne. A yield of 25 percent was obtained. Upon analysis the product was found to have the following compositions: Calculated for $C_{24}H_{40}$: C, 87.7; H, 12.3. Found: C, 87.2; H, 12.0. Infrared bands were found at 3.33, 6.25 and 14.0μ. The ultraviolet maximum was at 229 mμ (ε 45,000).

*Example 13.—Preparation of 7-phenylhept-1-ene*

1-phenylhept-1-ene (1 mole) prepared by the dehydration of 1-phenylheptan-1-ol over alumina was heated with triisobutylborane (0.33 mole plus 15 percent excess) at 200° C. for 24 hours to give tri(7-phenylheptyl)borane. Cyclotetradeca-1,8-diyne (0.55 mole) was added and the mixture heated to 200° C. Very pure 7-phenylhyst-1-ene was distilled off at a boiling point of 58–62° C. at a pressure of 0.2 millimeters of mercury. The infrared spectrum showed only the vinyl-bands at 10.1 and 11.0μ, and no trace of trans-olefin absorption at 10.35μ. In contrast, the olefin obtained by dehydration of 7-phenylheptan-1-ol over alumina at 350° C. showed a band at 10.35μ having the same intensity as the band at 11.0μ.

*Example 14.—Preparation of vinylcyclohexane*

The olefin mixture obtained by dehydration over alumina of 1-ethylcyclohexanol was heated with one equivalent (0.33 mole plus a 15 percent excess) of triisobutylborane at 200° C. for 4 hours to give by isomerization and finally fixation of boron at the terminal carbon atom, tri(2-cyclohexylethyl)borane. Cyclotetradeca-1,8-diyne was added in 10 percent excess and the mixture heated to 160°–200° C. under nitrogen. Very pure vinylcyclohexane having a boiling point of 130–140° C. was distilled off. The infrared spectrum showed the characteristic bands at 3.26, 3.32, 6.10, 10.1 and 11.0μ for the vinyl group and no other olefinic bands.

*Example 15.—Preparation of phenyl benzyl ketone*

Diphenylacetylene (2.9 grams, 0.016 mole) was treated with triisobutylborane in the manner set forth in Example 4. The resulting trialkenylborane was diluted with hexane and dropped into a mixture of sodium hydroxide (6 N) and hydrogen peroxide (30 percent in water). Extraction gave 1.6 grams of crystalline phenyl benzyl ketone.

*Example 16.—Preparation of decan-5-one*

In a manner similar to that employed in the previous example, decan-5-one was prepared in a 76 percent yield from dec-5-yne. The product was liquid and had a boiling point of 200–210° C. Infrared spectrum showed a band at 5.8μ.

*Example 17.—Preparation of cyclotetradeca-7-en-1-one*

Triisobutylborane (1.8 grams, 0.01 mole) was heated with a twelve fold excess (0.08 mole) of cyclotetradeca-1,7-diyne to a temperature of about 170° C. After the calculated quantity of isobutene had evolved as determined by weight loss, the excess of diyne was recovered by distillation in vacuo. The remaining tricycloalkenylborane was then dissolved in tetrahydrofuran and oxidized with a hydrogen peroxide-sodium hydroxide mixture. Extraction with ether and distillation gave cyclotetradeca-7-yn-1-one in 50 percent yield. Upon analysis the cycloalkynone had the following composition: Calculated for $C_{14}H_{22}O$: C, 81.5; H, 10.75; O, 7.8. Found: C, 81.7; H, 10.7; O, 7.8.

Hydrogenation of the cycloalkynone on a Findlar catalyst gave cyclotetradeca-7-en-1-one. Upon analysis the cycloalkenone had the following composition: Calculated for $C_{14}H_{24}O$: C, 80.7; H, 11.6; O, 7.7. Found: C, 80.7; H, 11.3; O, 7.8. The infrared spectrum showed bands at 3.35, 6.04, and 14.73μ (cis-double bond) and at 5.84μ (ketone).

*Example 18.—Preparation of cyclohexadeca-8-en-1-one*

Triisobutylborane (1.8 grams, 0.01 mole) was heated with a twelvefold excess of 1,8-cyclohexadecadiyne to a temperature of 170° C. After the calculated quantity of isobutene had evolved as determined by weight loss, the excess of diyne was recovered by distillation in vacuo. The remaining tricycloalkenylborane was then dissolved in tetrahydrofuran and oxidized with a hydrogen peroxide-sodium hydroxide mixture. Extraction with ether and distillation gave cyclohexadeca-8-yn-1-one in 50 percent yield. Upon analysis the cycloalkynone had the following composition: Calculated for $C_{16}H_{26}O$: C, 82.0; H, 11.2; O, 6.8. Found: C, 82.2; H, 11.45; O. 7.15.

Hydrogenation of the cycloalkynone on a Findlar catalyst gave cyclohexadeca-8-en-1-one. Upon analysis the cycloalkenone had the following composition: Calculated for $C_{16}H_{28}O$: C, 81.3; H, 11.9; O, 6.8. Found: C, 81.6; H, 11.6; O, 5.8. The infrared spectrum showed bands at 3.35, 6.04, and 14.73μ (cis-double bond) and at 5.84μ (ketone).

*Example 19.—Preparation of cyclooctadeca-9-en-1-one*

Triisobutylborane (1.8 grams, 0.01 mole) was heated with a twelvefold excess of 1,9-cyclooctadecadiyne to a temperature of 170° C. After the calculated quantity of isobutene had evolved as determined by weight loss, the excess of diyne was recovered by distillation in vacuo. The remaining tricycloalkenylborane was then dissolved in tetrahydrofuran and oxidized with a hydrogen peroxide-sodium hydroxide mixture. Extraction with ether and distillation gave cyclooctadeca-9-yn-1-one in 50 percent yield. Upon analysis the cycloalkynone had the following composition: Calculated for $C_{18}H_{30}O$: C, 82.4; H, 11.5; O, 6.1. Found: C, 82.0; H, 11.4; O, 6.6.

Hydrogenation of the cycloalkynone on a Findlar catalyst gave cyclooctadeca-9-en-1-one. Upon analysis the cycloalkenone had the following composition: Calculated for $C_{18}H_{32}O$: C, 81.75; H, 12.2; O, 6.05. Found: C, 82.6; H, 11.6; O, 5.8. The infrared spectrum showed bands at 3.35, 6.04, and 14.73μ (cis-double bond) and 5.84μ (ketone).

Although the invention has been illustrated by the preceding examples, it is not be construed as limited to the materials employed therein, but rather, the invention encompasses the generic area as hereinbefore disclosed. Various modifications and embodiments of this invention can be made without departing from the spirit and scope thereof.

What is claimed is:

1. A process for the preparation of unsaturated compounds characterized by the formulae:

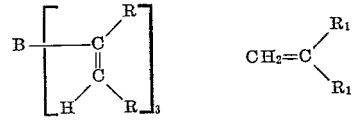

which comprises heating to a temperature of from about 125° C. to about 250° C. a mixture of a disubstituted acetylenic compound and a trihydrocarbylborane of the respective formulae:

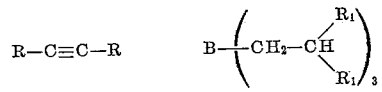

wherein R represents a hydrocarbyl group attached to the acetylenic carbon atoms through a saturated carbon to carbon bond with the proviso that both R's when taken together can form a cycloaliphatic ring with the acetylenic carbon atoms to which they are attached; $R_1$ represents a member selected from the group consisting of hydrogen and hydrocarbyl groups; and thereafter recovering said unsaturated compounds.

2. A process for the preparation of terminally unsaturated olefinic hydrocarbons of the formula:

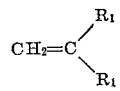

which comprises heating to a temperature of from about

125° C. to about 250° C. a mixture of a disubstituted acetylenic compound and a trihydrocarbylborane of the respective formulae:

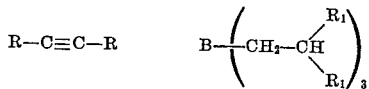

wherein R represents a hydrocarbyl group attached to the acetylenic carbon atoms through a saturated carbon to carbon bond; $R_1$ represents a hydrocarbyl group; and thereafter separating from said mixture said terminally unsaturated olefinic hydrocarbon.

3. The process of claim 2 wherein said trihydrocarbylborane is triisobutylborane.

4. A process for the preparation of vinylcyclohexane which comprises heating to a temperature of from about 125° C. to about 250° C. a mixture of tri(2-cyclohexylethyl)borane and cyclotetradeca-1,8-diyne and thereafter separating vinylcyclohexane from said mixture.

5. A process for the preparation of 7-phenylhept-1-ene which comprises heating to a temperature of from about 125° C. to about 250° C. a mixture of tri(7-phenylheptyl)borane and cyclotetradeca-1,8-diyne and thereafter separating 7-phenylhept-1-ene from said mixture.

References Cited
UNITED STATES PATENTS 3,173,967   3/1965   Brown _____ 260—683.2

OTHER REFERENCES

Herbert C. Brown et al.: J. American Chem. Soc. 81, p. 1512, 1959.

Herbert C. Brown et al.: J. American Chem. Soc. 83, pp. 3834–3840, 1961.

A. J. Hubert et al.: J. Chem. Soc. (London), pp. 6669–6674, 1965.

DELBERT E. GANTZ, *Primary Examiner.*

V. O'KEEFE, *Assistant Examiner.*